April 24, 1962     E. L. RAPPLEAN     3,031,172
FUEL SYSTEM FOR INTERNAL COMBUSTION ENGINES
Filed Dec. 28, 1959     3 Sheets-Sheet 1

INVENTOR.
EUGENE L. RAPPLEAN
BY
Charles H Bassett
ATTORNEY

INVENTOR.
EUGENE L. RAPPLEAN

United States Patent Office 3,031,172
Patented Apr. 24, 1962

3,031,172
FUEL SYSTEM FOR INTERNAL COMBUSTION ENGINES
Eugene L. Rapplean, Ferguson, Mo., assignor to ACF Industries, Incorporated, New York, N.Y., a corporation of New Jersey
Filed Dec. 28, 1959, Ser. No. 862,411
9 Claims. (Cl. 261—51)

This invention relates to fuel system for internal combustion engines.

In the operation of conventional fuel systems for internal combustion engines, fuel is aspirated into the throat of a venturi responsive to air flow therethrough to provide a charge having a substantially constant air-fuel ratio. In order to provide such a constant air-fuel ratio, it is necessary to maintain a constant fuel level within a fuel bowl.

Charge forming devices provided with a float controlled needle valve for maintaining fuel at a constant level within a fuel bowl have heretofore been used on boats and automotive vehicles and function to provide a fuel mixture to suit engine requirements if the engine is operated in its normal position. However, during travel of small boats at high speeds over rough water, a float controlled needle valve is not operable to maintain a constant fuel level within a fuel bowl.

It is, therefore, an object of the invention to provide a fuel system in which fuel is maintained at a substantially constant level within a fuel bowl of a charge forming device during operation of an engine in either normal or inclined positions.

Another object of the invention resides in the provision of a fuel system wherein fuel is continuously supplied from a fuel tank to a fuel bowl of a charge forming device in quantities in excess of engine requirements, and such excess fuel is returned from the fuel bowl to the fuel tank through an overflow return conduit to thus maintain a constant fuel level within the bowl.

A further object of the invention resides in the provision of a fuel system that is inexpensive in construction and reliable in operation.

Another object of the invention resides in the provision of a charge forming device wherein the fuel mixture supplied to an engine is more accurately controlled to effect better engine performance and greater economy of operation.

The invention embodies other novel features, details of construction and arrangement of parts which are hereinafter set forth in the specification and claims and illustrated in the accompanying drawing, wherein:

Figure 1:
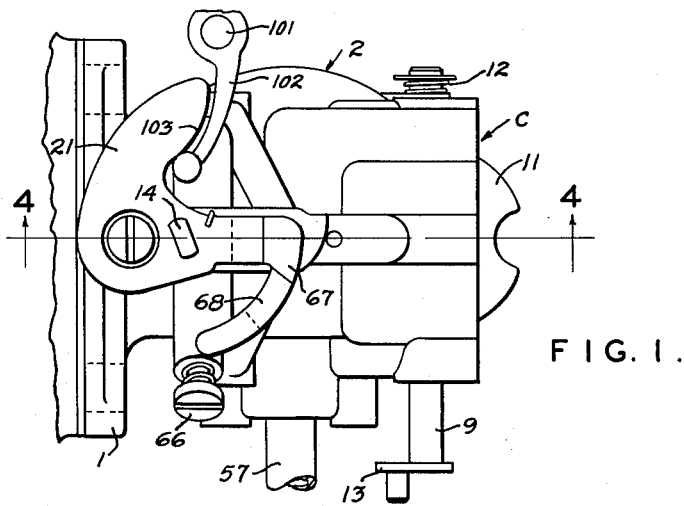
FIG. 1 is a top plan view showing a floatless carburetor embodying features of the invention.
Figure 2:
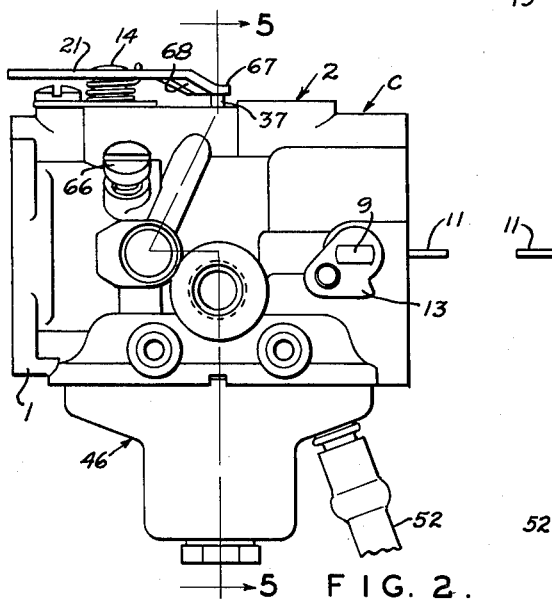
FIG. 2 is an elevation showing one side of the carburetor.
Figure 3:
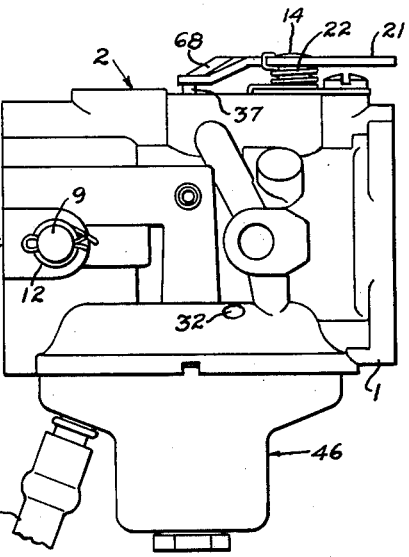
FIG. 3 is an elevation showing the opposite side of the carburetor.

Referring now to the drawings for a better understanding of the invention, the fuel system for internal combustion engines is shown as comprising a carburetor body 2 having a horizontal mixture conduit 3 provided with an air inlet 4, an outlet 6, and a venturi 7 having a throat 8. A flange 1 is provided on the outlet end of the body for attachment to an engine inlet manifold 5.

A choke valve shaft 9 is journaled in bearing apertures formed in the body 2 to support a choke valve 11 for pivotal movement within the air inlet 4. The choke valve 11 is normally maintained in its full open position, as indicated in FIG. 1, by means of a torsion spring 12 having one end thereof secured to the shaft 9 and its other end secured to the body 2. The choke valve 11 is adapted to be pivoted to its closed or choke position by manual movement of an arm 13 secured to one end of the choke shaft 9.

A throttle shaft 14 is journaled in bearing apertures formed in the body 2 to support a throttle valve 16 for pivotal movement in the outlet 6, the shaft being engaged against axial movement relative to the body 2 by means of a plate 17 secured to the body by a screw 18 and having an end thereof engaged in an annular groove 19 formed in the shaft. A manually operable control arm 21 is secured to one end of the throttle shaft 14 to control the proportion and quantity of fuel and air supplied to the engine. The throttle valve 14 is biased toward its closed position by means of a helical torsion spring 22 having one of its ends engaging the body 2 and its other end engaging the control arm 21.

Figure 4:
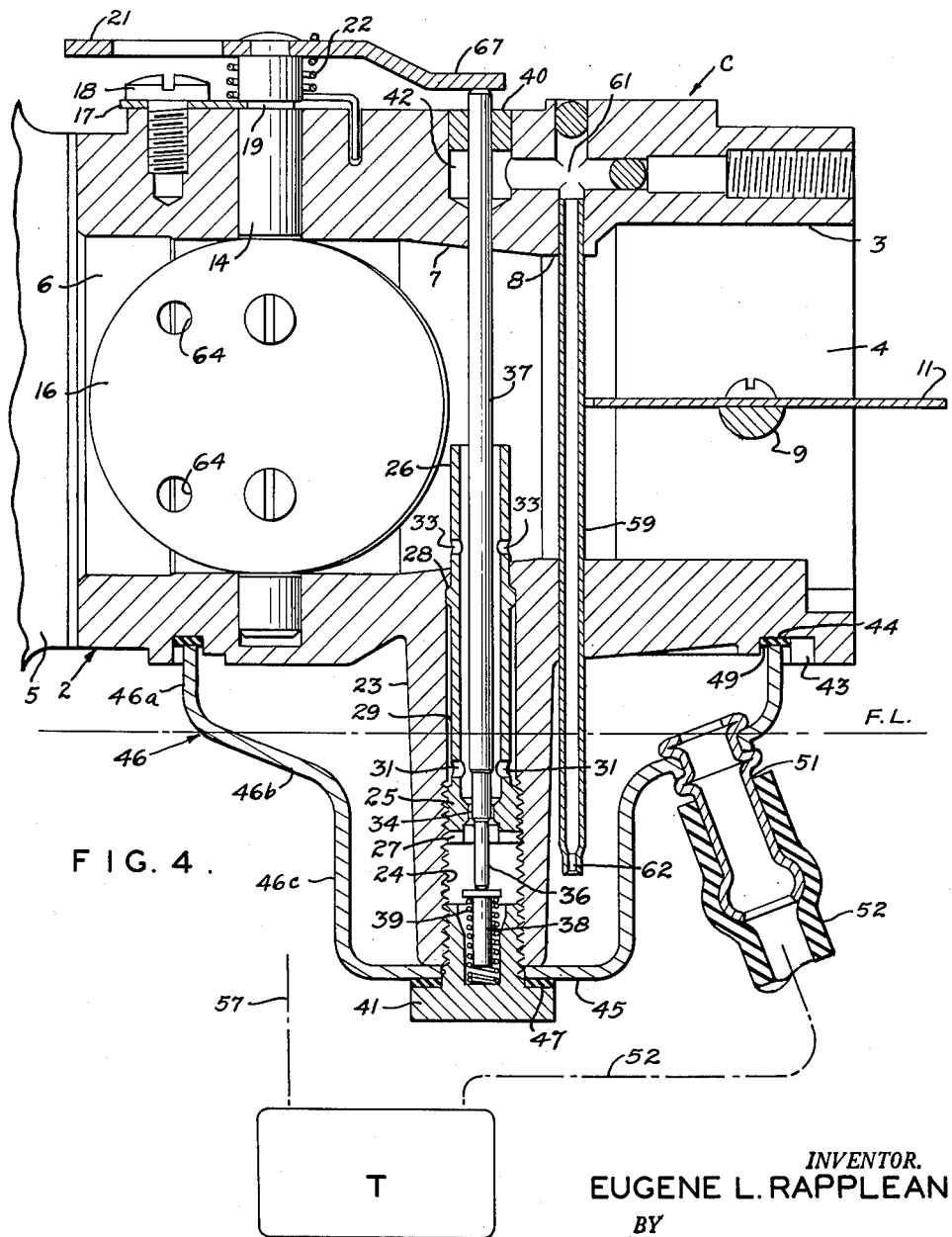
FIG. 4 is a longitudinal section taken along the line 4—4 of FIG. 1.
Figure 5:
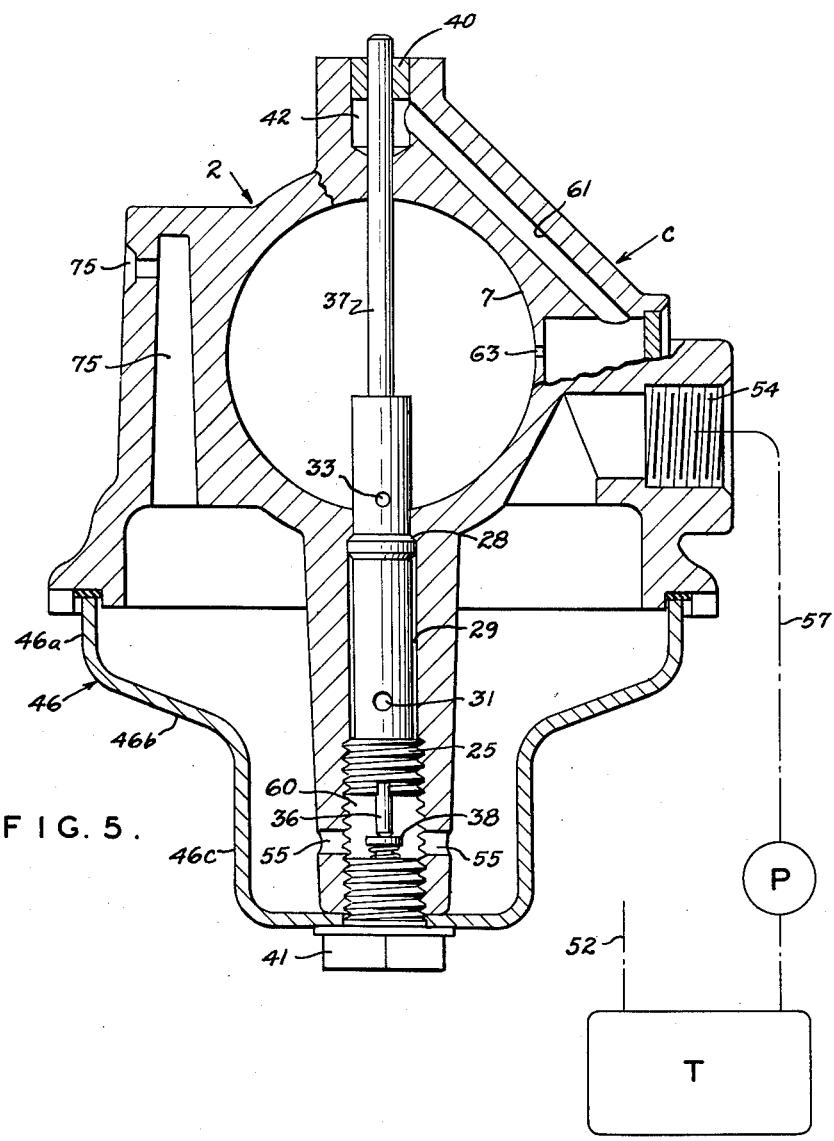
FIG. 5 is a transverse section taken along the line 5—5 of FIG. 2.

The body 2 is provided with a downwardly projecting tubular stem 23 having its lower end internally threaded at 24 for engagement with the lower externally threaded end 25 of a main fuel nozzle 26, as illustrated in FIG. 4. The lower end of the nozzle is slotted at 27 for engagement by a screw driver during assembly to rotate the nozzle into tight leakproof engagement against an annular shoulder 28. The portion of the nozzle between its threaded end 25 and the shoulder 28 is reduced in diameter to define with the stem 23 a fuel well 29. A plurality of ports 31 are formed in the nozzle for the passage of fuel into and out of the lower end of the well 29, and an air bleed passage 32 is formed in the body 2 leading from atmosphere to the upper end of the well.

The upper end of the main fuel nozzle 26 projects upwardly into the venturi 7 posterior to the throat 8 and is provided with a plurality of low speed ports 33. A fuel metering orifice 34 is formed in the lower end of the main fuel nozzle 26 to receive the lower end 36 of a metering rod 37. The lower end of the metering rod 37 engages a headed pin 38 which is resilient supported upon a helical compression spring 39 seated at its lower end in a fuel bowl mounting screw 41. The upper end of the metering rod 37 extends through a bearing 40 press-fitted into an opening 42 in the body 2.

The lower portion of the body 2 is formed with a downwardly projecting annular flange 43 having a recess 44 therein to receive the rim portion of a cup-shape fuel bowl 46, the bottom 45 of the bowl having an aperture 47 to receive the screw 41. To insure a substantially constant fuel level, the fuel bowl is formed with a relatively large upper cylindrical section $46^a$ merging with a frusto-conical section $46^b$ which, in turn, merges with a relatively small lower cylindrical section $46^c$ concentric with said other sections and with the stem 23. The frusto-conical section $46^b$ is formed with an aperture to receive a nipple 51 connected to a fuel return conduit 52 leading to a fuel tank T. During assembly, the screw 41 first engages the bowl rim against a gasket 49 in the recess 44, and then forces the bowl bottom 45 against the stem 23.

An air vent 75 leads from atmosphere through the body 2 to the bowl. During operation of the engine, fuel is continuously supplied to the fuel bowl 46 from a tank T through a conduit 57 and pump P to the fuel inlet 54. Fuel within the bowl passes through ports 55 into a chamber 60 in the stem 23 below the orifice 34, and excess fuel delivered to the bowl is returned to the tank T through the return conduit 52.

An idle fuel system is shown as comprising a hollow idle tube 59 extending vertically from within the fuel bowl 46 through the venturi throat 8 to an idle passage 61 in the body 2, the lower end of the tube 59 being disposed below the fuel level in the bowl and provided with a restricted orifice 62. The idle passage 61 extends to an idle port 63 leading into the mixture conduit 3 anterior to the edge of the throttle valve 16 when the latter is in its closed position. Apertures 64 are provided in the throttle valve 16 for the passage of air when the latter is in its closed position. An idle adjustment screw 66 is threaded into the body 2 to regulate the flow of fuel through the idle passage 61.

A cam 67 having an inclined surface 68 is provided on the control arm 21 for slidable engagement along the upper end of the metering rod 37 responsive to rotational movement of the control arm, whereby the metering rod is moved axially to vary the quantity of fuel passing through the orifice 34. The lower end of the metering rod may be provided with one or more sections of different diameters, as shown in FIG. 4, or may be formed with a long tapering surface, whereby the flow area through the orifice 34 may be varied responsive to axial movement of the metering rod.

In the operation of the carburetor thus shown and described, fuel is forced from the tank T through the conduit 57 to the pump P, and thence into the fuel bowl 46 in excess of engine requirements. To maintain the fuel at a predetermined substantially constant level F.L. within the bowl, such excess fuel is removed from the bowl through the nipple 51 and conduit 52.

During idle operation of an engine, the throttle valve 16 is in its closed position and fuel is supplied to the mixture conduit 3 through the idle tube 59, passage 61, and idle port 63, under control of the idle adjustment screw 66. To effect a slight increase in engine speed, the control arm 21 is manually pivoted to move the throttle valve 16 to a part open position to cause fuel to be drawn upwardly through the main nozzle 26 and out through the ports 33 into the mixing conduit 3.

Further gradual pivotal movement of the control arm 21 moves the throttle valve 16 toward its full open position and permits the spring 39 to raise the metering rod 37 as the latter passes along the inclined surface 68 on the cam 67 to thereby increase the flow area and the volume of fuel flowing through the orifice 34 for passage upwardly and out through the upper end of the main nozzle 26 into the center of the mixture conduit 3. When the throttle valve 16 is opened quickly to provide rapid acceleration of an engine, additional fuel and air is drawn from the well 29 through the openings 31 into the main nozzle 26 for discharge therefrom into the mixing conduit 3.

By providing a manually operable mechanical means for simultaneously operating the throttle valve and metering rod, the quantity and proportion of fuel and air may be accurately controlled to effect a material saving of from 10% to 30% in fuel and an improvement in engine performance during idling, part throttle, acceleration, and full throttle.

Figure 6:
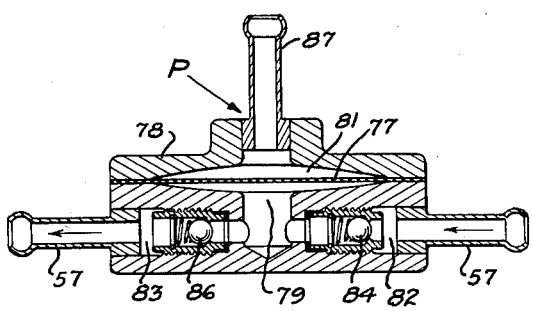
FIG. 6 is a section illustrating a diaphragm pump.

FIG. 6 illustrates a conventional diaphragm pump P operable responsive to pressure pulsations within the crankcase K of an engine. The pump is shown as comprising a housing body 76 having a flexible diaphragm 77 secured thereto by a cover 78 to define a pump chamber 79 and a pressure pulsation chamber 81. The pump chamber 79 is provided with a fuel inlet 82 and an outlet 83 having inlet and outlet check valves 84 and 86, respectively, therein. A conduit 87 leads from the pulsation chamber 81 to the engine crankcase K.

By providing an engine with a fuel system of the type shown and discribed, it is possible to maintain a substantially constant fuel level within the carburetor fuel bowl to insure a proper fuel mixture to satisfy engine requirements under abnormal conditions of operation as heretofore mentioned. It is contemplated that the throttle valve of the carburetor may be manually actuated by a mechanical linkage including a rotatable shaft 101 having an arm 102 secured thereto to engage a cam surface 103 on the throttle actuating arm 21.

When a floatless carburetor of the type shown and described is applied to an outboard motor for boats, the nipple 51 is preferably positioned between the stem 23 and the front end of the boat to maintain the fuel at the proper level in the bowl 46 during rising of the bow of a small high speed boat.

Certain structure have been described herein which will fulfill all the objects of the present invention, but it is contemplated that other modifications will be obvious to those skilled in the art which come within the scope of the invention as defined by the appended claims.

I claim:

1. In a fuel system for an internal combustion engine, a carburetor comprising a body having a horizontal mixture conduit therein, a throttle valve in said conduit, a cup-shape fuel bowl depending from said body and having an overflow outlet, said body having a fuel inlet leading to said bowl and a main fuel passage leading upwardly from said bowl to said mixture conduit, said bowl having a downwardly converging frusto-conical side wall section concentric with said main fuel passage, and interconnecting generally cylindrical side wall sections, said overflow outlet being provided in said frusto-conical side wall section and adapted to return excess fuel from said bowl to a fuel tank to thus maintain a constant fuel level within the bowl.

2. In a fuel system for an internal combustion engine, a carburetor comprising a body having a horizontal mixture conduit therein, a throttle valve in said conduit, a cup-shape fuel bowl depending from said body and having an overflow outlet, said body having a fuel inlet leading to said bowl and a main fuel passage leading upwardly from said bowl to said mixture conduit, said bowl having a downwardly converging frusto-conical side wall section concentric with said main fuel passage and interconnecting generally cylindrical side wall sections, said overflow outlet being provided in said frusto-conical side wall section and adapted to return excess fuel from said bowl to a fuel tank to thus maintain a constant fuel level within the bowl, and pump means to supply fuel from a tank to said bowl in excess of engine requirements.

3. In a fuel system for an internal combustion engine, a carburetor comprising a body having a horizontal mixture conduit therein, a throttle valve in said conduit, a cup-shape fuel bowl depending from said body and having an overflow outlet, said body having a fuel inlet leading to said bowl and a main fuel passage leading upwardly from said bowl to said mixture conduit, said bowl having a downwardly converging frusto-conical side wall section concentric with said main fuel passage, and interconnecting generally cylindrical side wall sections, said overflow outlet being provided in said frusto-conical side wall section and adapted to return excess fuel from said bowl to a fuel tank to thus maintain a constant fuel level within the bowl, and an idle fuel passage leading from said fuel bowl to idle ports in said mixture conduit adjacent said throttle valve.

4. In a fuel system for an internal combustion engine, a carburetor comprising a body having a horizontal mixture conduit therein, a throttle valve in said conduit, a cup-shape fuel bowl depending from said body and having an overflow outlet, said body having a fuel inlet leading to said bowl and a main fuel passage leading upwardly from said bowl to said mixture conduit, said bowl having a downwardly converging frusto-conical side wall section concentric with said main fuel passage, and interconnecting generally cylindrical side wall sections, said overflow outlet being provided in said frusto-conical side wall section and adapted to return excess fuel from said bowl to a fuel tank to thus maintain a constant fuel level within the bowl, said main fuel passage having a restricted orifice, a fuel metering rod in said orifice, and means operable responsive to movement of said throttle valve to move said rod to vary the flow of fuel through said orifice.

5. In a fuel system for an internal combustion engine, a carburetor comprising a body having a horizontal mixture conduit therein, a throttle valve in said conduit, a cup-shape fuel bowl depending from said body and having an overflow outlet, said body having a fuel inlet leading to said bowl and a main fuel passage leading upwardly from said bowl to said mixture conduit, said bowl having a downwardly converging frusto-conical side wall section concentric with said main fuel passage, and interconnecting generally cylindrical side wall sections, said overflow outlet being provided in said frusto-conical side wall section and adapted to return excess fuel from said bowl to a fuel tank to thus maintain a constant fuel level within the bowl, said main fuel passage having a restricted orifice, a fuel metering rod in said orifice, and means operable responsive to movement of said throttle valve to move said rod to vary the flow of fuel through said orifice, and an idle fuel passage leading from said fuel bowl to idle ports in said mixture conduit adjacent said throttle valve.

6. A carburetor for an internal combustion engine comprising a body having a horizontal mixture conduit therein, a throttle valve in said conduit, a cup-shape fuel bowl depending from said body, means forming a fuel inlet leading to said bowl and a main fuel passage leading upwardly from said bowl to said mixture conduit, said bowl having upper and lower cylindrical side wall sections interconnected by a downwardly converging frusto-conical side wall section concentric with said main fuel passage, an overflow outlet provided in said frusto-conical side wall section to remove excess fuel from said bowl and thus maintain a constant fuel level within said bowl, said main fuel passage means formed with one end of said main fuel passage positioned within said lower cylindrical side wall bowl section below said overflow outlet.

7. A carburetor for an internal combustion engine comprising a body having a horizontal mixture conduit therein, a throttle valve in said conduit, a cup-shaped fuel bowl depending from said body, said body having a fuel inlet leading to said bowl and means forming a main fuel passage leading upwardly from said bowl to said mixture conduit, said bowl having a side wall comprising upper and lower cylindrical sections interconnected by an intermediate section, an overflow outlet provided in said intermediate side wall section, a conduit connected through said intermediate wall section and adapted to return excess fuel from said bowl to a fuel tank to thus maintain a constant fuel level within the bowl, said main fuel passage means having a restricted orifice therein and a portion thereof extending coaxially into said lower cylindrical bowl section.

8. In a fuel system for an internal combustion engine, a carburetor comprising a body having a mixture conduit therein, a throttle valve in said conduit, a cup-shaped fuel bowl connected to said body below a portion of said mixture conduit, means forming a fuel inlet leading to said bowl and a main fuel passage leading upwardly from said bowl to said mixture conduit portion, said bowl having a pair of coaxially disposed generally cylindrical side wall sections and a converging frusto-conical side wall section interconnecting said side wall sections, and means forming an overflow outlet in said frusto-conical side wall section and adapted to return excess fuel from said bowl to a portion of said fuel system to thus maintain a constant fuel level within the bowl.

9. In a fuel system for an internal combustion engine, a carburetor comprising a body having a mixture conduit therein, a throttle valve in said conduit, a cup-shaped fuel bowl connected to said body below a portion of said mixture conduit, means forming a fuel inlet leading to said bowl and a main fuel passage leading upwardly from said bowl to said mixture conduit portion, said bowl having a pair of coaxially disposed generally cylindrical side wall sections and a converging frusto-conical side wall section interconnecting said side wall sections, and an overflow conduit connected through said frusto-conical side wall section and adapted to return excess fuel from said bowl to a portion of said fuel system to thus maintain a constant fuel level within the bowl, said main fuel passage means having an inlet thereto positioned below said overflow conduit.

References Cited in the file of this patent
UNITED STATES PATENTS

| | | |
|---|---|---|
| 1,022,803 | Troutt | Apr. 9, 1912 |
| 1,722,735 | Deland | July 30, 1929 |
| 1,919,793 | Linga | July 25, 1933 |
| 2,050,567 | Griffin et al. | Aug. 11, 1936 |
| 2,063,107 | Mack | Dec. 8, 1936 |
| 2,409,965 | Udale | Oct. 22, 1946 |
| 2,713,854 | Conover | July 26, 1955 |
| 2,722,208 | Conroy et al. | Nov. 1, 1955 |
| 2,796,838 | Phillips | June 25, 1957 |